（12）United States Patent
Siomina et al.

(10) Patent No.: US 8,731,579 B2
(45) Date of Patent: May 20, 2014

(54) ENHANCED ANGLE-OF-ARRIVAL POSITIONING

(75) Inventors: Iana Siomina, Solna (SE); Ari Kangas, Lidingö (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 173 days.

(21) Appl. No.: 13/262,533

(22) PCT Filed: Jul. 12, 2011

(86) PCT No.: PCT/SE2011/050948
§ 371 (c)(1),
(2), (4) Date: Sep. 30, 2011

(87) PCT Pub. No.: WO2012/096607
PCT Pub. Date: Jul. 19, 2012

(65) Prior Publication Data
US 2012/0258729 A1  Oct. 11, 2012

Related U.S. Application Data

(60) Provisional application No. 61/432,366, filed on Jan. 13, 2011.

(51) Int. Cl.
*H04W 24/00* (2009.01)
(52) U.S. Cl.
USPC ........................................ 455/456.1
(58) Field of Classification Search
USPC ............ 455/456.2, 456.1, 101, 436; 370/336, 370/201, 315, 252
See application file for complete search history.

(56) References Cited

U.S. PATENT DOCUMENTS

| 2004/0208238 | A1 | 10/2004 | Thomas et al. | |
| 2010/0002643 | A1* | 1/2010 | Han et al. | 370/329 |
| 2010/0302102 | A1* | 12/2010 | Desai et al. | 342/417 |

FOREIGN PATENT DOCUMENTS

| WO | 02/50563 A1 | 6/2002 |
| WO | 2010/069610 A1 | 6/2010 |

OTHER PUBLICATIONS

3rd Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 10)," 3GPP TS 36.305 v10.0.0, Dec. 2010, pp. 1-51.

(Continued)

*Primary Examiner* — Kiet Doan
(74) *Attorney, Agent, or Firm* — Coats & Bennett, PLLC

(57) ABSTRACT

The position of a mobile device served in a cell of a serving node of a wireless communication network is estimated by estimating an angle-of-arrival (AoA) between the mobile device and the serving node based on a precoding matrix indicator (PMI) determined for the serving node in a downlink direction or for the mobile device in an uplink direction. Also estimated is the AoA between the mobile device and a non-serving neighbor node of the wireless communication network based on a PMI determined for the neighbor node in the downlink direction or for the mobile device in the uplink direction. The downlink and/or uplink AoA estimation can be further enhanced by employing interference cancellation in the mobile device and in the radio node, respectively. The position of the mobile device is estimated based on the estimated AoAs.

9 Claims, 11 Drawing Sheets

(56) References Cited

OTHER PUBLICATIONS

Kim et al., "Geolocation in Ad Hoc Networks Using DS-CDMA and Generalized Successive Interference Cancellation," IEEE Journal on Selected Areas in Communications, May 2005, pp. 984-998, vol. 23, No. 5, IEEE Service Center, Piscataway, NJ.

Wigren, T. "Adaptive Enhanced Cell-ID Fingerprinting Localization by Clustering of Precise Position Measurements." IEEE Transactions on Vehicular Technology, vol. 56, No. 5. Sep. 2007.

3rd Generation Partnership Project. "Expected Performance of OTDOA-IPDL Positioning—Initial Indication Based on Live Measurements." 3GPP TSG-RAN WG1 Meeting #37, R1-040567, Montreal, Canada, May 10-14, 2004.

3rd Generation Partnership Project. 3GPP TS 36.211, V10.0.0 (Dec. 2010). 3rd Generation Partnership Project; Technical Specification Group Radio Access Network; Evolved Universal Terrestrial Radio Access (E-UTRA); Physical channels and modulation (Release 10). Dec. 2010.

3rd Generation Partnership Project. 3GPP TS 36.213, V10.0.1 (Dec. 2010). 3rd Generation Partnership Project; Technical Specification Group Radio Access Network; Evolved Universal Terrestrial Radio Access (E-UTRA); Physical layer procedures (Release 10). Dec. 2010.

Dahlman, E. et al. 3G Evolution, Second Edition: HSPA and LTE for Mobile Broadband. Academic Press/Elsevier, 2008. p. 102.

* cited by examiner

ENHANCED ANGLE-OF-ARRIVAL POSITIONING

PRIORITY CLAIM

This application claims priority from U.S. Provisional Patent Application No. 61/432,366 filed on 13 Jan. 2011, the content of said application incorporated herein by reference in its entirety.

FIELD OF TECHNOLOGY

The present application relates in general to enhanced positioning functionality and improved positioning performance in the LTE cellular system, and in particular to positioning methods exploiting Angle of Arrival (AoA) measurements.

BACKGROUND

The possibility to determine the position of a mobile device has enabled application developers and wireless network operators to provide location based, and location aware, services. Some examples of such services are guiding systems, shopping assistance, friend finder, presence services, community and communication services and other information services giving the mobile user information about their surroundings.

In addition to commercial services, governments of many countries require network operators to determine the position of an emergency call. For instance, the governmental requirements in the United States (FCC E911) mandate that it must be possible to determine the position of a certain percentage of all emergency calls. The requirements make no difference between indoor and outdoor environment.

Positioning methods that use the wireless network can be grouped in two main groups. The first group includes methods that are based on the radio cell to which a mobile terminal is attached, e.g. by using Cell-ID or a combination of cell-ID and timing advance (TA) measurements. The TA measurement principle is depicted in FIG. 1. Briefly, the travel time of radio waves from the eNodeB (enhanced NodeB) to the UE (user equipment) and back is measured. The distance from eNodeB to UE is given by $$r = c\frac{TA}{2}$$

where TA is the timing advance and where c is the speed of light.

The TA alone defines a circle, or if the inaccuracy is accounted for, a circular strip around the eNodeB. By combining this information with the cell polygon, left and right angles of the circular strip can be computed. The terminal position is determined as the intersection of the serving cell and the circular strip.

As for other terrestrial positioning methods such as observed time difference of arrival (OTDOA), these suffer from too low detection performance to provide acceptable performance, at least in the basic configuration.

Another approach is provided by so called fingerprinting positioning. Fingerprinting positioning algorithms operate by creating a radio fingerprint for each point of a fine coordinate grid that covers the Radio Access Network (RAN). The fingerprint may e.g. include: the cell IDs that are detected by the terminal, in each grid point; quantized path loss or signal strength measurements, with respect to multiple eNodeBs, performed by the terminal, in each grid point (an associated ID of the eNodeB may also be needed); quantized TA, in each grid point (an associated ID of the eNodeB may also be needed); and/or quantized AoA information.

Whenever a position request arrives to the positioning method, a radio fingerprint is first measured, after which the corresponding grid point is looked up and reported. This requires that the point is unique. The database of fingerprinted positions can be generated in several ways. A first alternative is to perform an extensive surveying operation that performs fingerprinting radio measurements repeatedly for all coordinate grid points of the RAN (radio access network). The disadvantages of this approach include: the surveying required becomes substantial also for small cellular networks; and the radio fingerprints are in some instants (e.g. signal strength and pathloss) sensitive to the orientation of the terminal, which is particularly troublesome for handheld terminals. For fine grids, the accuracies of the fingerprinted positions therefore become highly uncertain. This is unfortunately seldom reflected in the accuracy of the reported geographical result.

Another approach, applied e.g. in Adaptive Enhanced Cell IDentity positioning (AECID), is to replace the fine grid by high precision position measurements of opportunity, and to provide fingerprinting radio measurements for the points. This avoids the above drawbacks. However, algorithms for clustering of high precision position measurements of opportunity must be defined and algorithms for computation of geographical descriptions of the clusters must also be defined.

With regard to AoA, the AoA measurement standardized for LTE (long term evolution) is defined as the estimated angle of a UE with respect to a reference direction which is the geographical north, positive in the clockwise direction. AoA can reduce the angular uncertainty as compared to cell ID and TA positioning if combined with TA, as illustrated in FIG. 2.

Future wireless systems like LTE and WiMAX utilize so called Multiple-Input Multiple-Output (MIMO) transmission schemes to increase spectral efficiency. MIMO schemes assume that the transmitter and receiver are both equipped with multiple antennas, and that multiple modulated and precoded signals are transmitted on the same time-frequency resource element e.g. as illustrated in FIGS. 3-4.

Mathematically the transmitted signal for a particular frequency/time resource element (k,l) can be expressed as:

$$x(k,l) = W_{RI,PMI}(k,l) \cdot s(k,l) \qquad (1)$$

where s(k,l) is a vector with elements $s_i$, i=1, ..., RI, and where $s_i$ is a modulated symbol, RI is the rank indicator, i.e. the number of signals (layers) transmitted on the same time-frequency resource element, $W_{RI,PMI}(k,l)$ is the so-called precoding matrix of dimension $N_{tx} \times RI$, x(k,l) is a vector of transmitted signals, where x(i), i=1, ..., $N_{tx}$, is the signal transmitted from the ith transmit antenna. The indices RI and PMI attached to the precoder indicate that the precoder is selected from a finite set of precoders as will be explained later herein. The signal is transmitted over a channel with channel matrix H which is of dimension $N_{rx} \times N_{tx}$. The received signal vector is then an $N_{rx}$ dimensional vector given by:

$$y = Hx = HW_{RI,PMI} s + e \qquad (2)$$

where e is the noise and interference vector, with covariance matrix $R_e$. In equation (2) and further in the description, indices (k,l) have been omitted to simplify the notation.

The UE can estimate the channel matrix H based on reference symbols transmitted from all transmit antennas. The reference symbols are typically transmitted on orthogonal resources, i.e. a resource element used for transmitting reference symbols from one antenna is not used by any other antenna. An example of such signals are cell-specific reference signals (CRS). FIG. 4 illustrates mapping of the LTE CRS onto the time/frequency grid for CRS transmitted from one (the top-row illustration), two (second row of illustrations) and four antenna ports (bottom-row illustrations).

The used precoder matrix is signalled to the UE so that the UE can form the composite channel HW and demodulate the signal s. The precoder matrix W is selected from a codebook with a finite set of elements. For two TX (transmit) antennas the codebook in Table 1 is used.

TABLE 1

Codebook for transmission on antenna ports {0, 1}[3GPP TS 36.211].

| Precoder matrix index (PMI) | Transmission rank indicator (RI) | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

The choice of precoder matrix includes both rank selection (number of layers) and codebook index selection. For $N_s=1$, the codebook contains 4 alternative precoders. For rank 2, the codebook contains 3 alternatives. Assume now that the precoder selection is restricted to rank 1 elements. Then an estimate of the symbol s can be computed by combining the received signal in the following way (so-called IRC or MMSE weighting):

$$\hat{s}=(HW_{RI,PMI})^H R_e^{-1} y=(HW_{RI,PMI})^H R_e^{-1}(HW_{RI,PMI})s + (HW_{RI,PMI})^H R_e^{-1} e \quad (3)$$

The SNR after signal combining can be written:

$$SNR=(HW_{RI,PMI})^H R_e^{-1}(HW_{RI,PMI}) \quad (4)$$

To maximize the throughput, it is desired to choose the RI and PMI so that SNR is maximized. This requires knowledge of the channel matrix H and the covariance $R_e$, knowledge which is only present in the UE. Therefore the standards contain mechanisms so that UE can report the preferred RI and PMI to the base station.

Described next is how precoder selection relates to the location of the UE, based on the geometry shown in FIG. 5. Rank 1 transmission is assumed so that the precoder W is a column vector with kth element equal to $w_k$. The signal $s_k(t)=w_k \cdot s \cdot \exp(i\omega_c t)$ is transmitted from the kth antenna. The received noise-free signal is $r_k(t)=h \cdot w_k \cdot s \cdot \exp(i\omega_c(t-\tau_k))$ where h is the attenuation of the signal, $\tau_k$ is the delay from base station antenna k to the UE. This is $\tau_k=d_k/c$ where c is the speed of light. Assuming UE is far from base station relative to the distance between antennas, the relative delay can be written as $\tau_k-\tau_j=\Delta_{k,j}\sin(\theta)/c$. Assuming arbitrarily the sensor j=1 is the reference, then:

$$r_k(t)=h \cdot w_k \cdot s \cdot \exp(-i\omega_c \tau_1) \cdot \exp(i\omega_c(t-(\tau_k-\tau_1)))=h \cdot w_k \cdot s \cdot \exp(-i\omega_c \tau_1)\exp(i\omega_c t) \cdot \exp(i\omega_c \Delta_{k,1}\sin(\theta)/c)=h_c \cdot w_k \cdot \exp(i\omega_c t) \cdot \exp(-i 2\pi \Delta_{k,1}\sin(\theta)/\lambda) \cdot s$$

Here $\lambda$ is the wavelength and we have used the notation $h_c=h \cdot \exp(-\omega_c \tau_1)$.

The resulting SNR assuming for simplicity that $R_e=I$, h=1 is $SNR=(w_1+\ldots+w_N \exp(i2\pi \tilde{\Delta}_{N,1}\sin(\theta)))^H(w_1+\ldots+w_N \exp(i2\pi \tilde{\Delta}_{N,1}\sin(\theta)))$. The SNR for different precoders as a function of the angle of arrival ($\theta$) is plotted in FIG. 6 for two TX antennas and in FIG. 7 for four TX antennas with $\tilde{\Delta}_{k,j}=2*(k-1)$. There is a strong relation between azimuth and the index of the precoder maximizing SNR. Not all precoders may be useful. In the four TX case, only five candidate precoders are needed.

For two TX antennas it can be seen that 3 different precoders provide maximum SNR in different azimuth angles. Therefore a measurement that indicates any of these precoders can be viewed as a direction measurement. The fourth precoder has little use in this application. Therefore the measurement can be restricted to only the three candidates having a distinct lobe.

Another possibility is to make several measurements in which the strongest precoder from the first measurement is excluded. Thereby it may be possible to reduce the angular extension further. For example, if the first measurement indicates that the position is in the main lobe around $\theta=0$ degrees, the a second measurement excluding that precoder may provide additional information about whether the position is at a negative or positive angle relative to $\theta=0$. Thereby the angular extension can be reduced by 50%.

The description for AoA determination with precoding indices has been given so far for DL (downlink). Precoding matrix indicator (PMI) and rank indicator (RI) reporting currently defined by the standard is for the serving cell only.

PMI and RI in LTE may be reported for the serving cell by the UE to facilitate link adaptation and channel dependent codebook based precoding in the DL. The time and frequency resources that can be used by the UE to report PMI and RI are controlled by the eNodeB. PMI and RI reporting can be periodic or aperiodic. Periodic PMI and RI reports can be transmitted on PUCCH (UMTS LTE Physical Uplink Control Channel) or PUSCH (UMTS LTE Physical Uplink Shared Channel). Aperiodic PMI and RI reports can be transmitted on PUSCH. The minimum reporting interval for PMI and RI is 1 ms. PMI for neighbor cells of the UE, however, cannot be measured or reported with conventional methods. Precoders are also defined for UL (uplink), but the information is only available in the radio nodes (eNodeBs).

Three key network elements in an LTE positioning architecture are the LCS client, the LCS target and the LCS Server. The LCS Server is a physical or logical entity managing positioning for a LCS target device by collecting measurements and other location information, assisting the terminal in measurements when necessary, and estimating the LCS target location. An LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and the LCS Server processes and serves the received requests and sends the positioning result and optionally a velocity estimate to the LCS Client. A positioning request can be originated from the terminal or the network.

Two positioning protocols operating via the radio network exist in LTE, LPP and LPPa. LPP is a point-to-point protocol between an LCS Server and an LCS target device, used in order to position the target device. LPP can be used both in the user and control plane, and multiple LPP procedures are allowed in series and/or in parallel thereby reducing latency. LPPa is a protocol between an eNodeB and an LCS server specified only for control-plane positioning procedures, although it still can assist user-plane positioning by querying eNodeBs for information and eNodeB measurements. The SUPL protocol may be used as a transport for LPP in the user plane. In the user plane with SUPL, a UE is typically referred to as SUPL Enabled Terminal (SET) and the LCS platform is typically referred to as SUPL Location Platform (SLP). An LPP extension LPPe is also defined by OMA and may be used to extend the LPP signalling, e.g. to provide more extended position reports or provide more assistance data, e.g., to better support measurement of a certain method or to support more methods and RATs. Other extensions may potentially be supported by LPP in the future.

A high-level architecture defined in the current standard is illustrated in FIG. 8, where the LCS target is a terminal, and the LCS Server is an E-SMLC (evolved serving mobile location center) or an SLP (SUPL location platform). In FIG. 8, the control plane positioning protocols with E-SMLC as the terminating point are labelled LPP, LPPa and LCS-AP and the user plane positioning protocol is labelled SUPL/LPP. SLP may include two components, SPC and SLC, which may also reside in different nodes. In an example implementation, SPC has a proprietary interface with E-SMLC, and Llp interface with SLC, and the SLC part of SLP communicates with P-GW (PDN-Gateway) and the external LCS client.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

UE measurements for UE-assisted positioning are transmitted over LPP and/or SUPL. The current standard does not define a UE AoA measurement, and the measurement cannot be currently signalled over LPP to the positioning node.

The current standard defines AoA measurements only for eNodeBs, which can be reported by the radio node to the positioning node, and there is no requirement on the measurement accuracy. The AoA measured at the eNodeB is defined as the estimated angle of a user with respect to a reference direction, where the reference direction is the geographical North, positive in a counter-clockwise direction. The AoA measured at eNodeB is determined at the eNB antenna for an UL channel corresponding to the UE. The positioning result may be signalled between: the LCS target and LCS server, e.g. over LPP protocol; the positioning servers (e.g., E-SMLC and SLP), over standardized or proprietary interfaces; the positioning server and other network nodes (e.g., E-SMLC and MME/MSC/GMLC/O&M/SON); and the positioning node and LCS Client (e.g., between E-SMLC and PSAP or between SLP and External LCS Client).

Several problems have been identified with conventional techniques. PMI can be used to enable AoA measurements in the UE, but PMI measurements performed in DL and the corresponding signalling are limited to the serving cell only. Using PMI for AoA in UL has not been considered. Furthermore, precoding estimation in UL is limited to the serving cell also and the information is only available in radio nodes (e.g. eNodeBs). No UE AoA measurement is defined in the standard, and such no possibility to report it to the eNodeB or positioning node. There is no signalling means for signalling of PMI to the positioning node. Interference cancellation (IC) is not currently used for enhancing PMI-based AoA, in DL or UL. IC is not currently used for enhancing multi-cell AoA measurements, in DL or UL. Due to large false alarms that occur without IC, accuracy of AoA positioning, AoA+TA positioning, AECID and other fingerprinting positioning using AoA is relatively poor.

SUMMARY

Embodiments described herein include enhancing UE AoA determination by enabling multi-cell PMI-based AoA measurements, enhancing the measurements for AoA with IC (interference cancellation), and providing a signalling mechanism for ensuring delivery of UE angular information (PMI or AoA) to the positioning node.

Other Embodiments described herein include enhancing radio node (e.g. eNodeB or LMU) AoA determination by enhancing AoA measurements with IC, using multi-cell PMI technology for eNodeB AoA measurements, and providing a signalling mechanism for ensuring delivery of radio node angular information (PMI or AoA) to the positioning node, where the radio node angular information is the angular information determined at the radio node for a UE transmission.

Furthermore, UE AoA measurement is defined. In one embodiment the corresponding AoA measurement requirements are also defined. In another embodiment, the requirements on the AoA measurements performed by a radio node or by the UE are defined and tested based on the assumption of IC capability of the radio node or UE, respectively.

In yet another embodiment, requirements for AoA measurements in non-serving cell are also defined.

According to still another embodiment of a radio network node, the downlink AoA is converted to uplink AoA. Further, the converted value may be signalled to another node, e.g. a positioning node.

According to an embodiment of method of estimating a position of a mobile device served in a cell of a serving node of a wireless communication network, the method includes: estimating an angle-of-arrival (AoA) between the mobile device and the serving node based on a precoding matrix indicator (PMI) determined for the serving node in a downlink direction or for the mobile device in an uplink direction; estimating the AoA between the mobile device and a non-serving neighbor node of the wireless communication network based on a PMI determined for the neighbor node in the downlink direction or for the mobile device in the uplink direction; and estimating the position of the mobile device based on the estimated AoAs.

According to an embodiment of a radio node of a wireless communication network, the radio node include one or more processing circuits operable to: estimate an angle-of-arrival (AoA) between a serving node of the wireless communication network and a mobile device served in a cell associated with the serving node based on a precoding matrix indicator (PMI) determined for the serving node in a downlink direction or for the mobile device in an uplink direction; and estimate the AoA between the mobile device and a non-serving neighbor node of the wireless communication network based on a PMI determined for the neighbor node in the downlink direction or for the mobile device in the uplink direction.

According to an embodiment of a method of estimating a position of a mobile device served in a cell of a serving node of a wireless communication network, the method includes: applying interference cancellation to aid in determining a precoding matrix indicator (PMI) for the serving node in a downlink direction or for the mobile device in an uplink direction; estimating an angle-of-arrival (AoA) between the mobile device and the serving node based on the PMI determined with the aid of interference cancellation; and estimating the position of the mobile device based on the estimated AoA.

According to an embodiment of a radio node of a wireless communication network, the radio node includes one or more processing circuits operable to: apply interference cancellation to aid in determining a precoding matrix indicator (PMI) for a serving node of the wireless communication network in a downlink direction or for a mobile device served in a cell associated with the serving node in an uplink direction; estimate an angle-of-arrival (AoA) between the mobile device and the serving node based on the PMI determined with the aid of interference cancellation; and estimate the position of the mobile device based on the estimated AoA.

According to an embodiment of a mobile device, the mobile device includes one or more processing circuits operable to determine a precoding matrix indicator (PMI) for a serving node of a wireless communication network which serves the mobile station, and determine a PMI for a non-serving neighbor node of the wireless communication network and/or apply interference cancellation to aid in determining the PMI for the serving node.

According to an embodiment of a positioning node of a wireless communication network, the positioning node includes one or more processing circuits operable to: receive or estimate an angle-of-arrival (AoA) between a serving node of the wireless communication network and a mobile device served in a cell associated with the serving node based on a precoding matrix indicator (PMI) determined for the serving node in a downlink direction or for the mobile device in an uplink direction; and receive or estimate the AoA between the mobile device and a non-serving neighbor node of the wireless communication network based on a PMI determined for the neighbor node in the downlink direction or for the mobile device in an uplink direction.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 8:
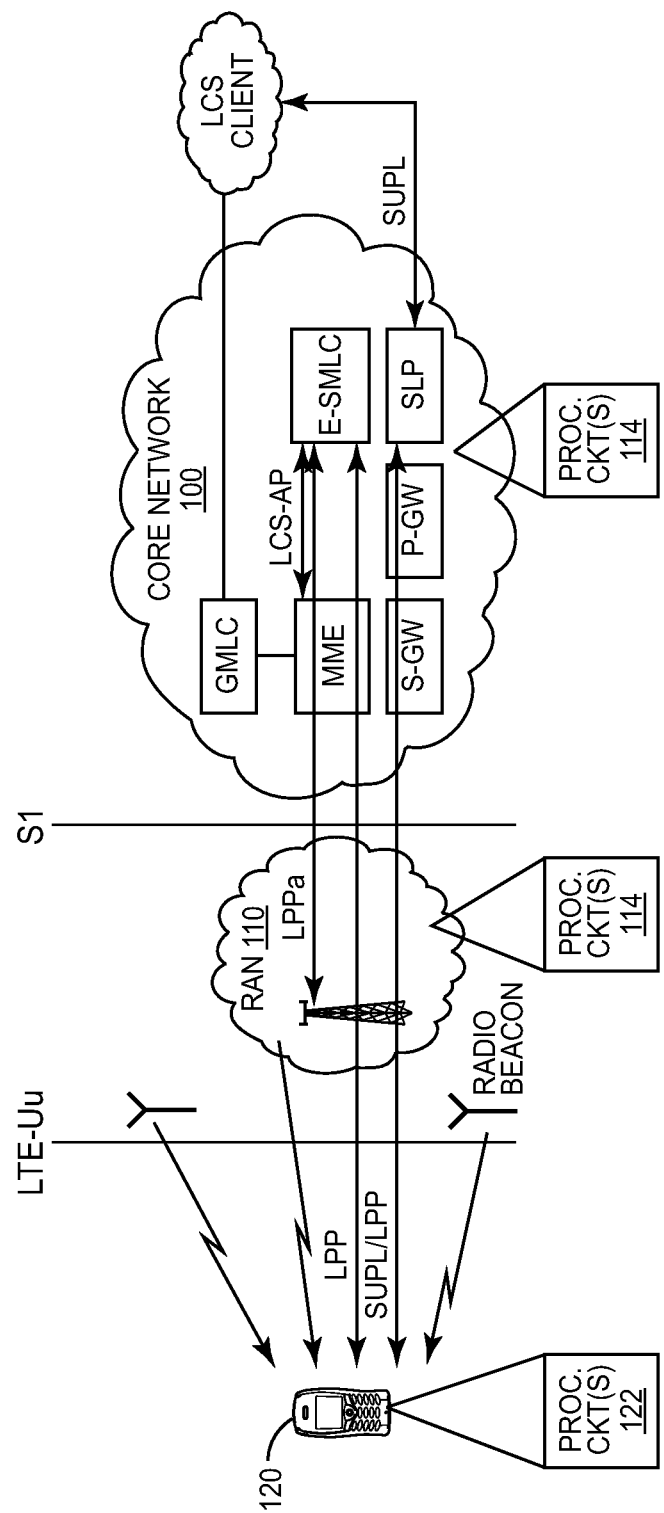
FIG. 8 illustrates a schematic block diagram of a wireless communication network.
Figure 9:
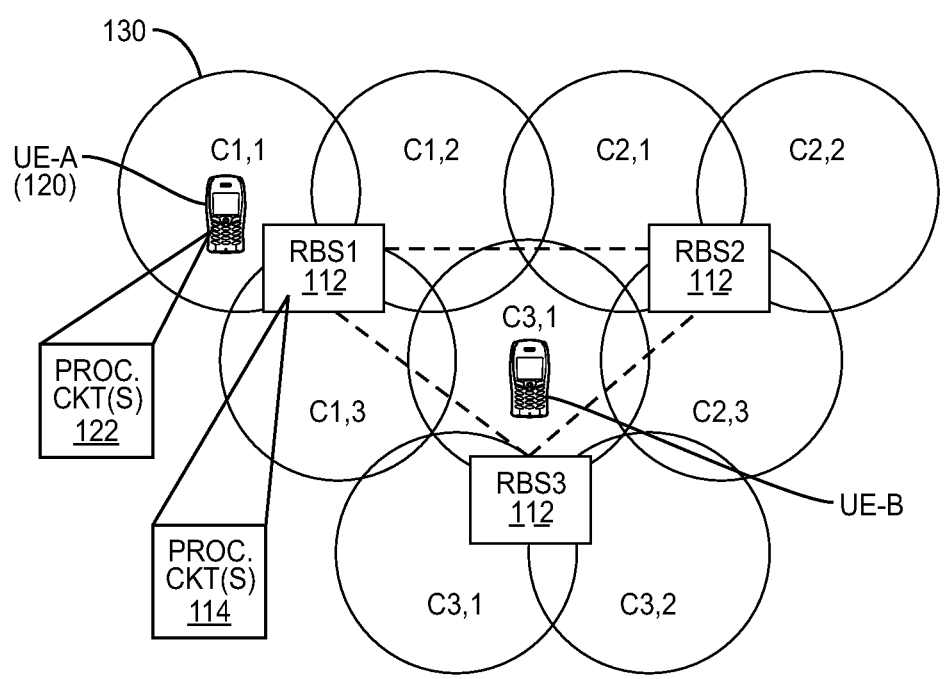
FIG. 9 illustrates the base stations and mobile devices included in the wireless communication network of FIG. 8 in more detail.

FIG. 8 illustrates a wireless communication network which includes a core network 100 (including a positioning node), a radio access network or RAN 110 (including base stations such as eNodeBs) and mobile devices 120 such as UEs which shall be understood in a general sense to include mobile terminals, small radio nodes equipped of DL receivers (e.g. femto base stations) and/or UL transmitters or relay nodes. FIG. 9 illustrates the base stations 112 and mobile devices 120 in more detail. Each base station 112 covers one or more cells 130 which serve mobile devices 120 such as UEs located in the cell. This includes both downlink (DL) i.e. serving node-to-UE transmissions and uplink (UL) i.e. UE-to-serving node transmissions. Adjacent or neighbor cells 130 include other mobile devices 120 served by the corresponding eNodeB(s) 112. For example, FIG. 9 shows UE-A located in cell C1,1 which is served by radio base station RBS1 and UE-B located in cell C3,1 which is served by RBS3. As such, cells C1,3 and C3,1 are considered neighbor cells and RBS1 and RBS3 are considered neighbor nodes. Each RBS can include an eNodeB and other radio network components. Each RBS is referred to herein as a serving node for the cells covered by the corresponding RBS. In FIG. 9 for example, RBS1 is the serving node for cells C1,x, RBS2 is the serving node for cells C2,x, and RBS3 is the serving node for cells C3,x.

Again referring to FIG. 9, UE-A performing DL measurements for the serving cell receives DL signals of interest from RBS1 and interfering signals from non-serving neighbor nodes RBS3 and RBS2. UE-A performing DL measurements for a neighbor cell receives DL signals of interest from the neighbor cell, associated with RBS1 or one of RBS2 or RBS3, and interfering signals from the serving cell and other non-serving neighbor cells associated with RBS1, RBS2 and RBS3. Similarly, RBS1 measuring UL signals from UE-A in the associated cell C1,1 receives UL signals of interest from UE-A and interfering inter-cell signals from non-serving neighbor cells C1,2, C1,3, C2,x and C3,x, but may also receive interfering intra-cell signals from UEs in C1,1. Of course, the mobile devices 120 can move about from cell-to-cell and thus the corresponding transmissions (UL and DL) may be considered signals of interest from the perspective of the current serving cell (and base station) and interfering signals to the same cell (and base station) at a different point in time.

Each mobile device 120 and base station 112 includes one or more respective processing circuit(s) 122, 114 which can include any type of hardware and/or software suitable for implementing the corresponding procedures described herein. For example, the processing circuit(s) 122, 114 may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof.

Figure 10:
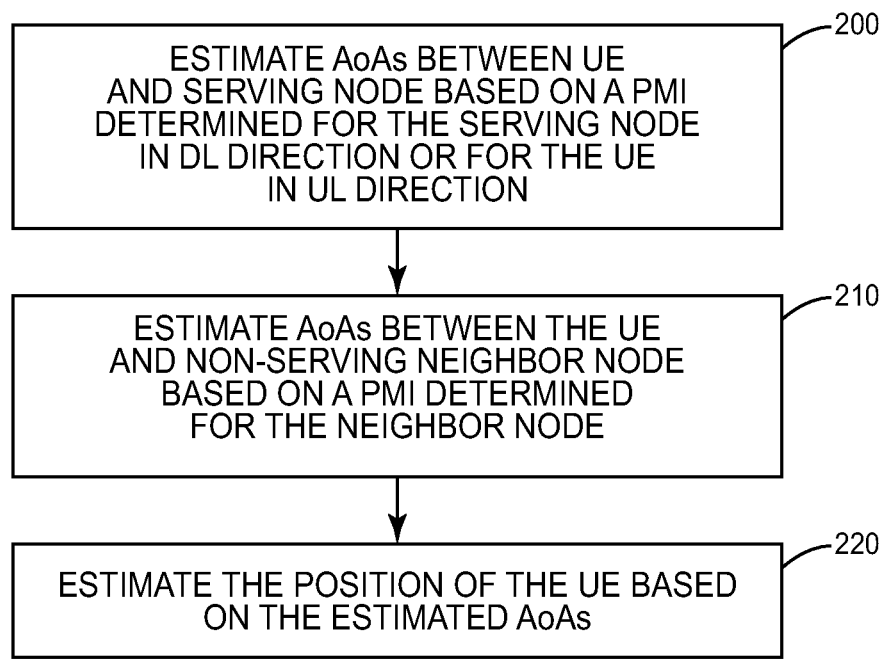
FIG. 10 illustrates a method of estimating a position of a mobile device served in a cell of a serving node of a wireless communication network.

FIG. 10 illustrates an embodiment of a method of estimating a position of a mobile device 120 served in a cell of a serving node 112 of the wireless communication network. For ease of explanation only, the method is described next with reference to FIG. 9. The method includes estimating an AoA between a mobile device 120 (e.g. UE-A) and the serving node 112 (e.g. RBS1) based on a precoding matrix indicator (PMI) determined for RBS1 in cell C1,1 in the DL direction or for UE-A in the UL direction (Step 200). The PMI (and rank indicator—RI) can be determined using any suitable conventional technique. The PMI information is used to determine the position of UE-A for either DL or UL communications.

Neighbor cell position information is also used to determine the position of UE-A for either DL or UL communications. Particularly, the AoA between UE-A and a non-serving neighbor node(s) of the wireless communication network is estimated based on a PMI determined for the neighbor node (Step 210). For example, the AoA can be estimated between UE-A and RBS2 and/or RBS3 to aid in determining the position of UE-A in the DL direction based on a PMI determined by UE-A for RBS2 and/or RBS3 e.g. as described previously herein. The position of UE-A is then estimated based on the AoAs estimated for the serving cell of the serving node and one or more neighbor cells comprised in one or more neighbor nodes (Step 220).

According to various embodiments described herein, UE (DL) AoA determination can be enhanced in several ways. Further, in one embodiment, UE AoA measurement and corresponding measurement requirements can be specified and tested according to newly defined corresponding requirements, where the requirements may be for determining AoA for the serving node or neighbor node, may imply or not using the PMI information for the determining of AoA, and may imply or not the UE capability to cancel the interference when determining the AoA.

In another embodiment of UE AoA determination, neighbor cell PMI-related measurements and neighbor cell PMI reporting to the network are provided. Conventionally, PMI determination and reporting is only possible for the serving cell. In one embodiment, neighbor cell PMI determination and possibly also reporting (e.g. over RRC—radio resource control) are also possible for the UE. If reported, the serving cell radio node is capable of receiving neighbor cell PMI/RIs. UE AoA determination based on PMI-related measurement or PMI/RI for multiple cells is therefore possible. The AoAs for neighbor cells may be determined in the UE or in the network (in the network when the PMIs can be signalled to the network).

Figure 5:
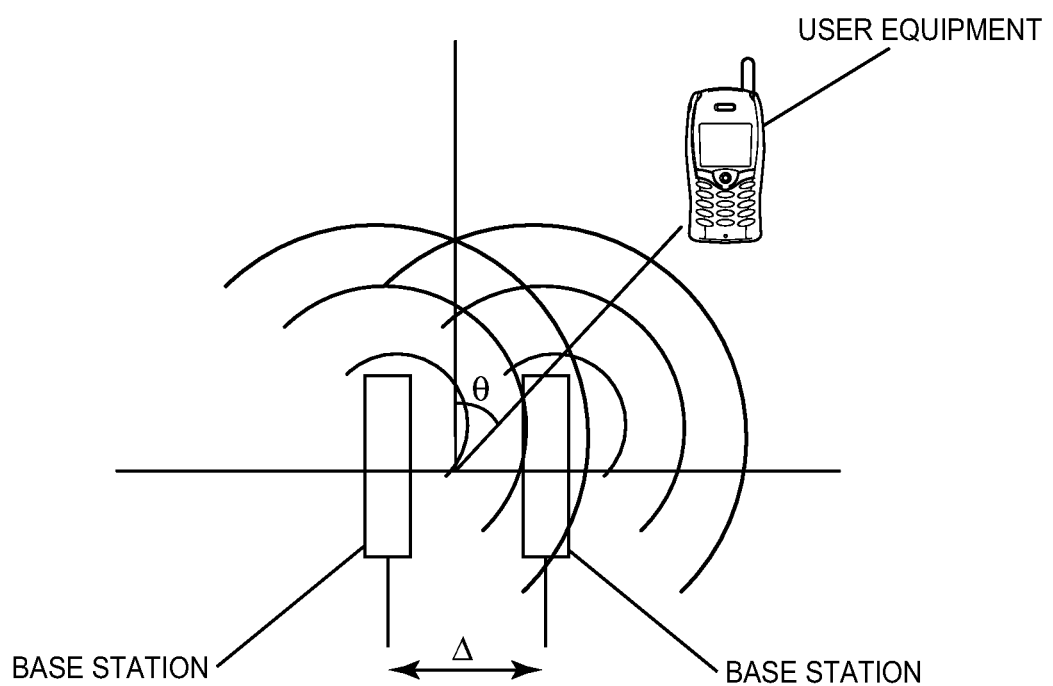
FIG. 5 illustrates angle of arrival between a UE and a serving base station.
Figure 6:
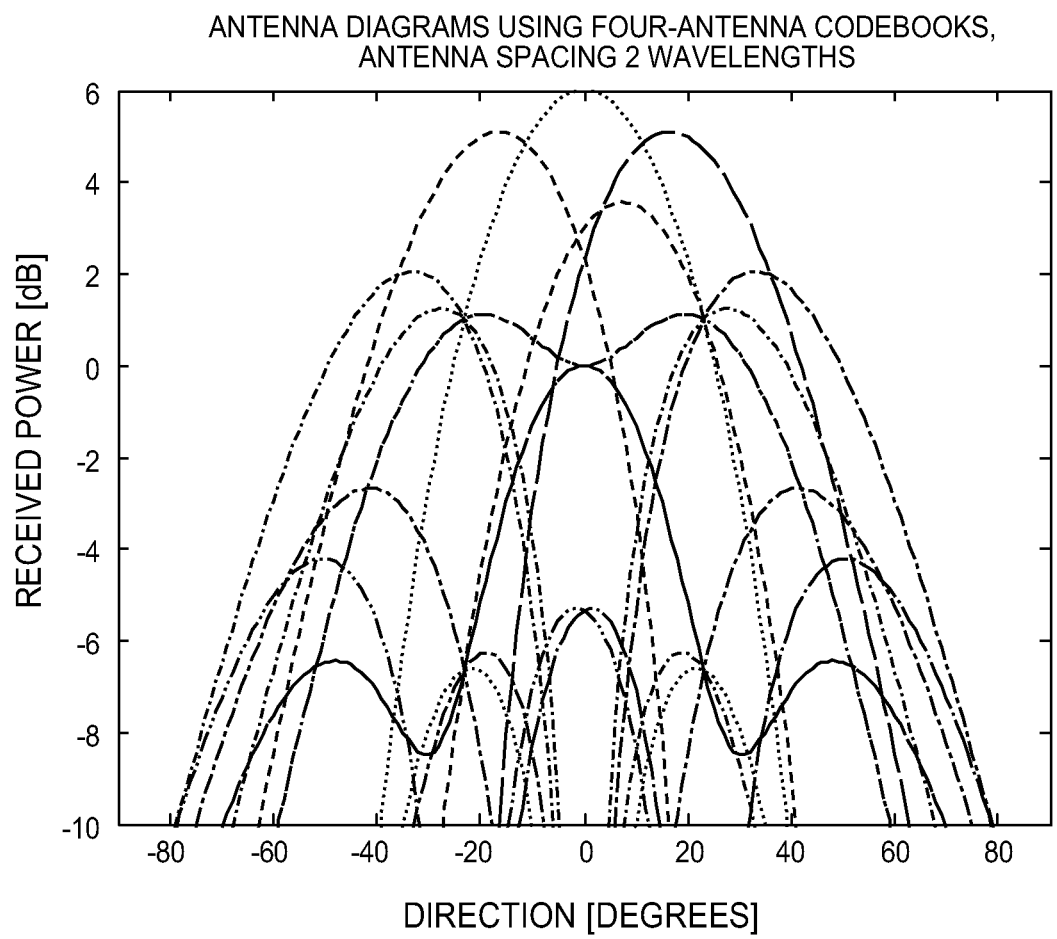
FIG. 6 illustrates SNR for different precoders as a function of angle of arrival for two transmit antennas.
Figure 7:
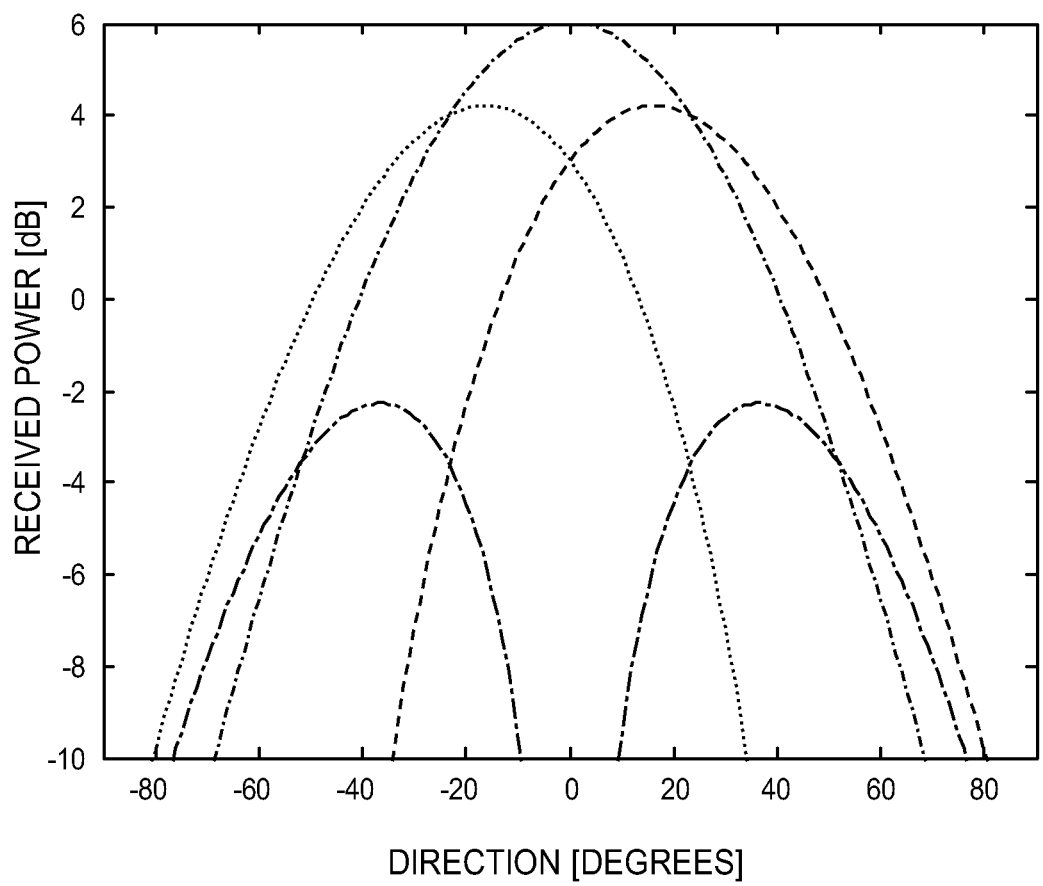
FIG. 7 illustrates SNR for different precoders as a function of angle of arrival for four transmit antennas.

An east north coordinate system can be used in which a UE is located at $(x_{UE}\ y_{UE})^T$. The base station that is involved in the AoA estimation process is located at $(x_{RBS}\ y_{RBS})^T$. In order to parameterize the position of the UE an estimate of the angle counted clockwise from north to the ray from the base station to the UE is determined, this is the AoA $\phi$. The UE is then located somewhere on the ray $x_{UE}=x_{RBS}+r\ \sin(\phi)$, $y_{UE}=y_{RBS}+r\ \cos(\phi)$ where r>0 is a parameter. One angle of arrival is not enough to determine r. The above equations do however make it clear that determination of the UE position requires both AoA measurements and a known base station position. The next step is to determine what is required to determine the AoA. Consider for example FIG. 5. As seen in FIG. 5, an angle $\theta$ is determined in this code by the pre-coding index selection feedback loop. Since only a precoding index is determined, the angle $\theta$ is best determined as the direction of the lobe of the precoding index, relative to the boresight antenna direction v. Hence $\phi=\theta+v$.

At this point it is possible to stop and simply configure the bore sight and lobe angles for a specific antenna arrangement. It is however also possible to compute the angle v by consideration of the antenna element spacing $\Delta$ and the carrier frequency $\omega_c$. This procedure is known from conventional techniques and not repeated here. The following quantities are needed in the eNodeB to arrive at a useful AoA: the eNodeB location, preferably in WGS84 coordinates; the bore sight angle of each sector (cell), with respect to north; and either configured lobe angles corresponding to the precoding index, or antenna element spacing, precoding indices and carrier frequency. For the uplink direction, node position, bore sight angle and lobe angles associated with the eNodeB and/or neighbor node can be signalled to the mobile device 120. The mobile device 120 can calculate the AoA between the mobile device and one or more of the nodes (the serving node and/or neighbor node) based on the position, bore sight angle and lobe angles of the corresponding node which were signalled to the mobile device 120 on the DL.

In yet another embodiment of UE AoA determination, UE AoA estimation is aided by IC (interference cancellation) to improve PMI/RI-based AoA estimation, where the AoA may be ultimately estimated in the UE or in the network node which receives PMI/RI reports. In situations with a strong interferer, i.e. $R_e<\sigma I$ where $\sigma$ is a small number below 1, the precoder index that maximizes the SNR may not be related only to the UE location, but to the interferer location. The precoder/lobe that maximizes SNR may be the precoder that nulls the interferer signal while maintaining sufficient desired signal energy. In such situations, an interference cancelling receiver can be used to improve the AoA estimates, since interference cancellation can be viewed as a spatial whitening filter, i.e. after IC the noise covariance matrix $R_e$ should be closer to a scaled unity matrix.

For LTE, IC schemes can be used as an alternative to the MMSE (minimum mean square error) approach for decoding MIMO transmissions. One common approach is to apply successive interference cancellation (SIC). SIC assumes that the spatially multiplexed signals are separately coded before transmission. In the case of successive interference cancellation each of the spatially multiplexed signals are separately decoded, starting with one of them. The decoded signal is then regenerated and subtracted from the total signal, thereby reducing the interfering effect it has on all other spatially multiplexed signals. The procedure is then repeated until the last spatially multiplexed signal is decoded.

A parallel approach, denoted parallel interference cancellation (PIC) is also possible. In that approach each spatially multiplexed signal is decoded and regenerated, after which it is subtracted from all other spatially multiplexed signals simultaneously for the next processing step.

The two methods differ in terms of complexity and latency with SIC being less complex but causing a higher latency than PIC. Depending on the scenario the two methods differ in terms of achievable performance.

Figure 1:
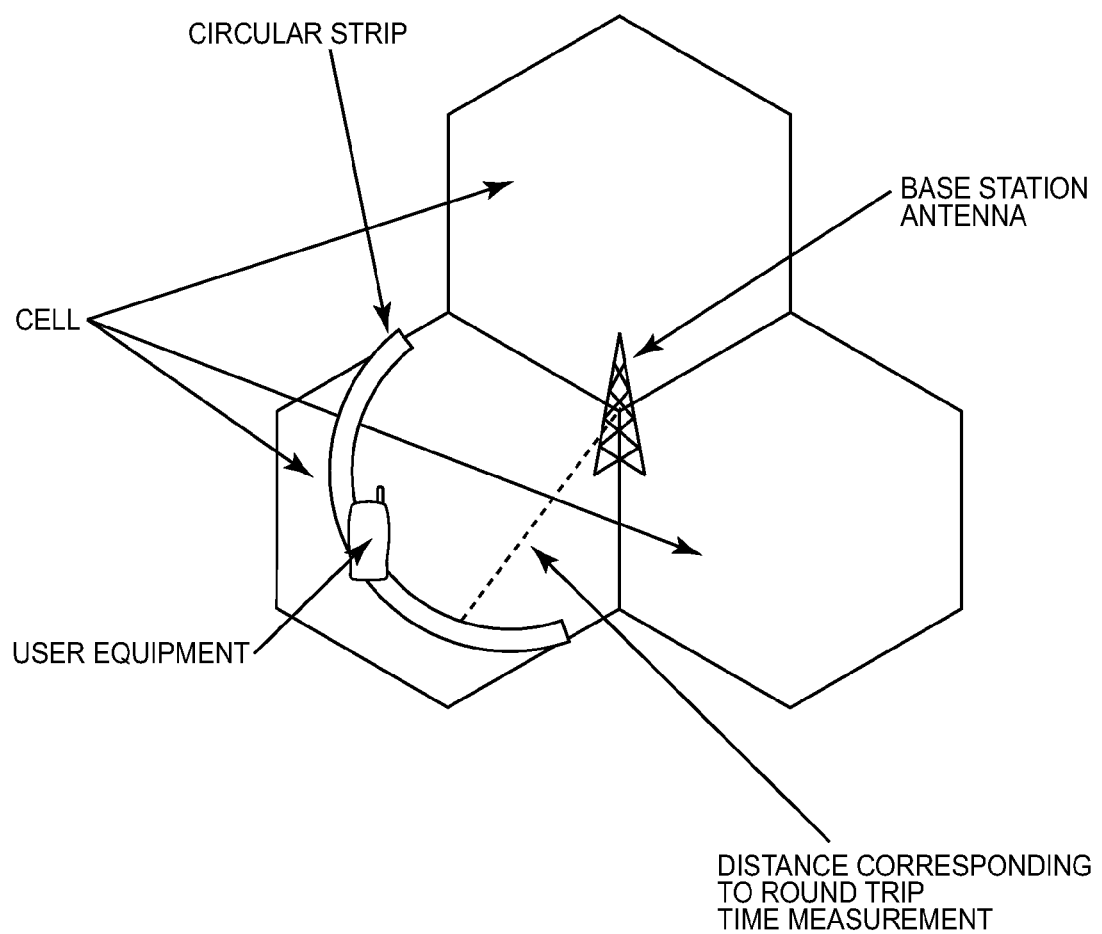
FIG. 1 illustrates the timing advance (TA) measurement principle.
Figure 2:
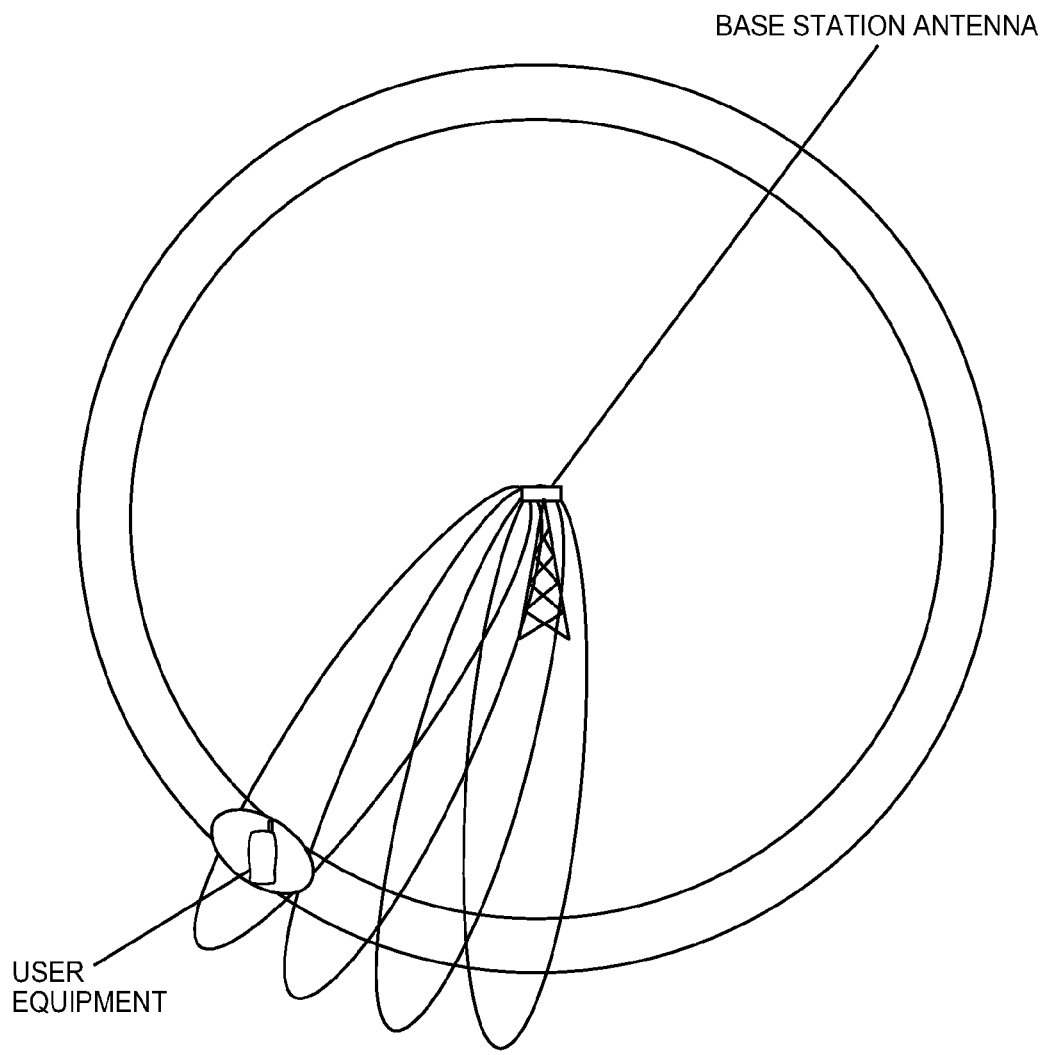
FIG. 2 illustrates angle of arrival measurement technique based on cell ID and TA positioning.
Figure 3:
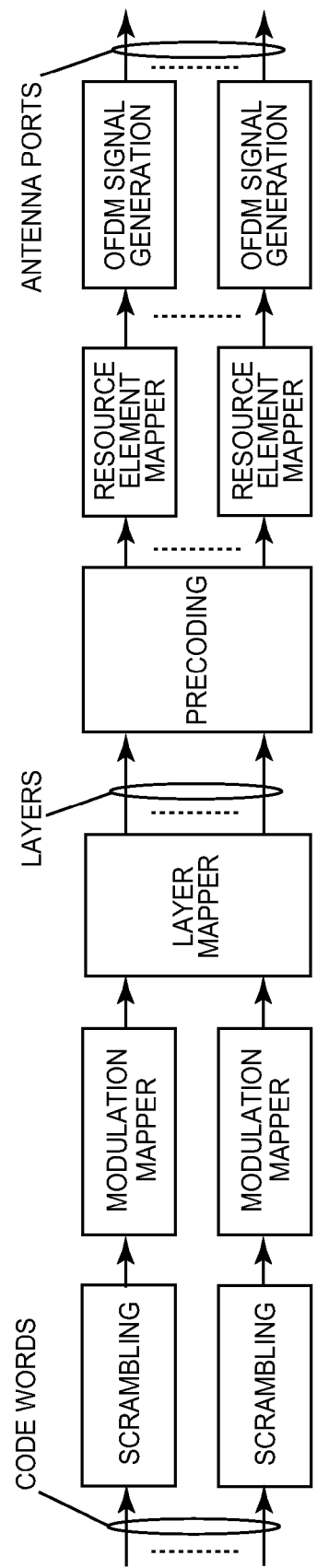
FIGS. 3 and 4 illustrate a MIMO scheme.
Figure 4:
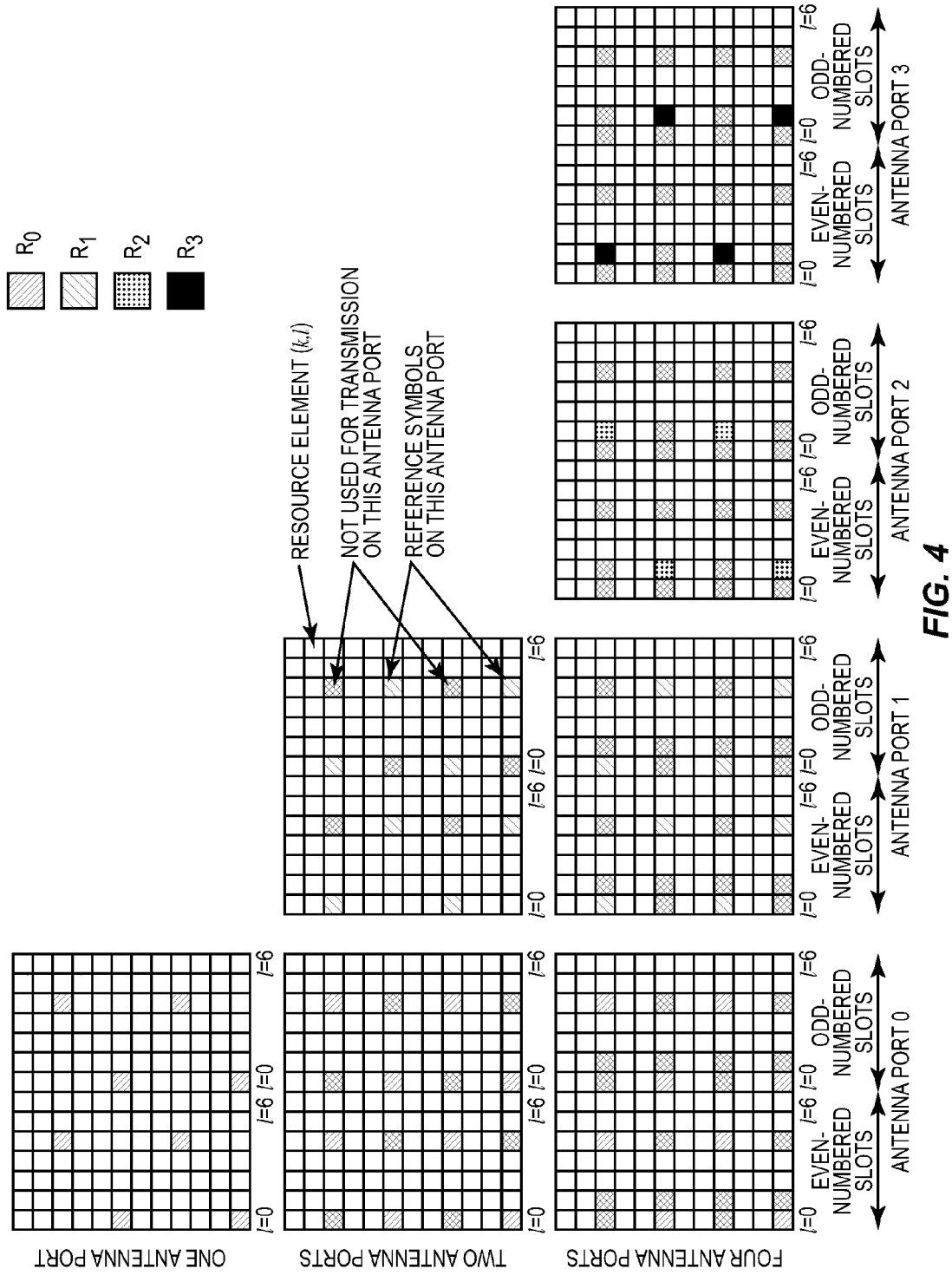

One problem with applying SIC/PIC in DL for improving AoA estimates is that the estimation of an optimal precoder is based on reference symbols, which are orthogonal within one cell, see FIG. 4, i.e. a resource element used for transmitting a reference symbol on a particular antenna is not used by any other antenna. Any interference cancellation would therefore involve cancelling of neighbor cell signal energy. This energy may originate both from data and pilot symbols. In case of data symbols IC becomes more involved since there is no prior knowledge available about neighbor cell symbols. In case this is to be utilized, IC is limited to pre-decoding techniques. One example where post decoding IC could be feasible for AoA measurements is on a non-serving cell, where the own received signal is cancelled as a first step. However this would probably require standard changes since precoder/rank selection is only defined for the serving cell.

IC can be used to facilitate the determination of a precoding index used for AoA determination. Although the technology is described next for CRS, other physical signals (e.g. synchronization signals or UE specific reference signals) may also be used, which is currently not possible with conventional approaches which rely on the PMI identification being based on CRS measurements.

Figure 11:
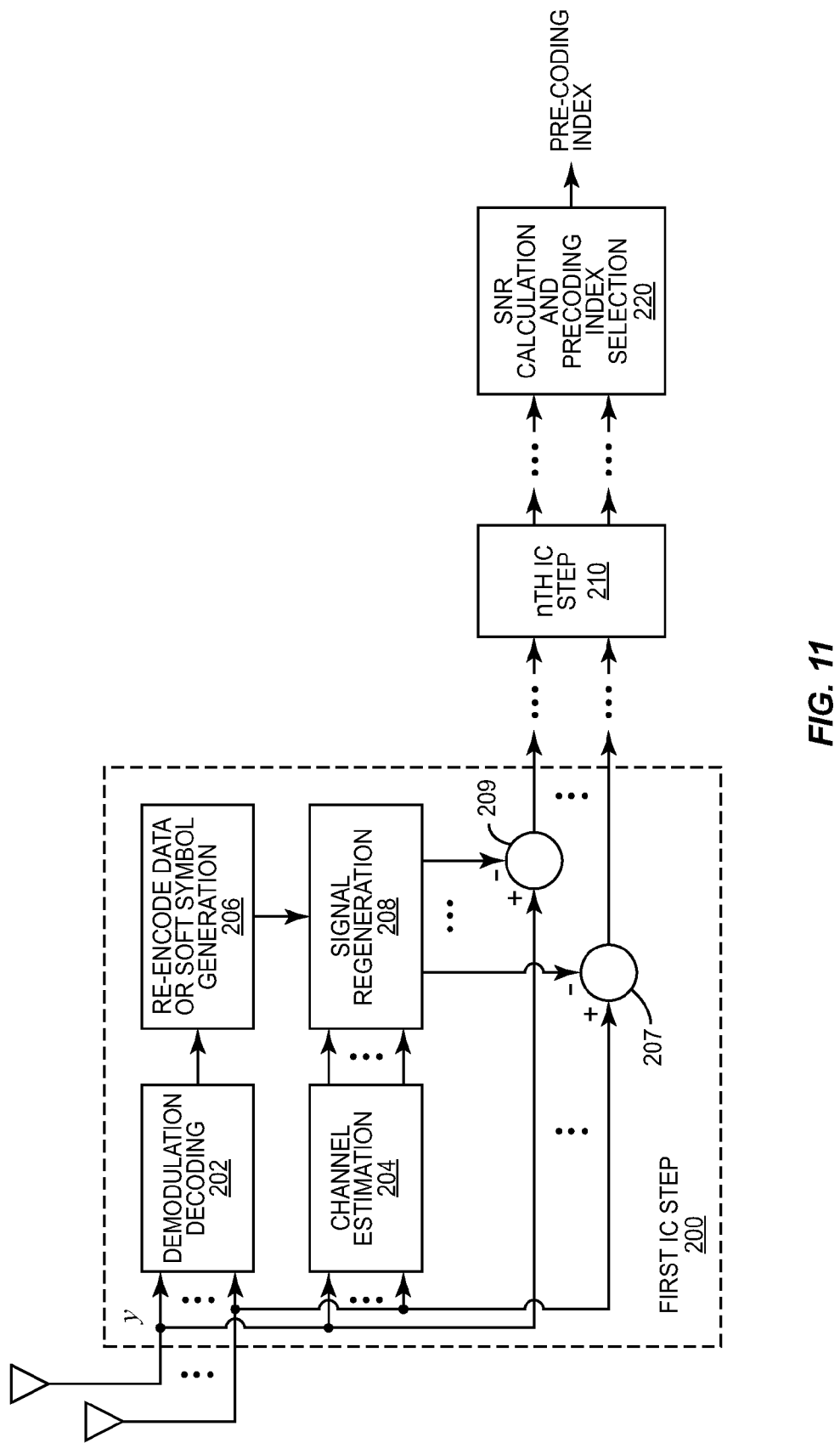
FIG. 11 illustrates a block diagram of a successive interference cancellation (SIC) method for enhancing AoA processing in a UE or base station.

FIG. 11 illustrates a block diagram of a SIC (successive interference cancellation) method for enhancing the AoA processing in a UE. Signals received in an MIMO antenna arrangement are first processed by a successive interference cancellation algorithm (Block 200), which includes a demodulation decoder 202, channel estimator 204, re-encoder/soft symbol generator 206, signal regenerator 208 and respective signal combiners 207, 209. There the different spatially multiplexed signals are decoded one after the other, and the decoded signals are cancelled in subsequent steps (Block 210). Doing so improves the estimation of signals and the channel. The quantities used to compute the SNRs (signal to noise ratios) used for selection of the pre-coding index are sent to the functional block that performs these calculations (Block 220).

To describe the selection of precoding index in more detail, the gain associated with the SIC diagram of FIG. 11 can be better understood by replacing the channel estimate H by an associated, more accurate estimates $H^{IC}$ obtained after IC. The covariance matrix is also modified to a corresponding matrix obtained after IC, $R_e^{IC}$. This approach results in the SNR measure $SNR^{IC} = (H^{IC}W_{RI,PMI})^H (R_e^{IC})^{-1}(H_{IC}W_{RI,PMI})$.

Assuming the dominant interferers have been cancelled with high cancellation efficiency, the residual covariance matrix $R_e^{IC}$ is closer to a unity matrix. As such, the SNR expression is maximized in a lobe that points toward the UE. The UE selects and reports to the network a PMI with RI that maximizes the SNR peak, where PMI/RI together with SNR peak indicate a certain direction.

In still another embodiment of UE AoA determination, a signalling mechanism is provided to ensure delivery of the UE angular information (PMI or UE AoA) to the positioning node. Once the precoding index (PMI) has been determined, the PMI is reported back to the serving eNodeB using previously standardized signalling. This signalling makes the UE angular information available in the eNodeB. Other signalling mechanisms are provided, as discussed next.

The following signalling ensures delivery of the UE angular information (PMI or UE AoA) to the positioning node. In one embodiment, neighbor cell PMIs/RIs are signalled from the UE to a radio node (e.g. to a serving eNodeB over RRC) or a network node (e.g. a positioning node), and a corresponding request for such a report is also signalled. In another embodiment, the UE AoA is signalled from the UE to a radio node (e.g. via RRC) or a positioning node (e.g. via LPP or LPPe), and a corresponding request for such a report is also signalled. In yet another embodiment, the UE AoA or PMI/RI is signalled from a radio node (e.g. eNodeB or LMU via LPPa) to the positioning node, and a corresponding request for such a report to the radio node is also signalled. In still another embodiment, the eNodeB AoA derived by conversion from UE AoA is signalled from the radio node to the positioning node. In another embodiment, a conversion mechanism is implied in a radio node, where the conversion can be applied to the UE AoA determined based on UE PMI in the radio node.

Alternatively, with obtaining an intermediate UE AoA, the eNodeB AoA can be derived directly from PMI reported by the UE. One example of such a conversion exploits the fact that there is 180-degree difference between the UE AoA and the eNodeB AoA. In one example the eNodeB AoA may be found from the UE AoA as $\text{mod}(UE_{AoA+pi}, 2*pi)$. More advanced conversion algorithms may also be considered, e.g. taking into account propagation environment effects.

Since the UE is measuring on a set of neighbor eNodeBs, and intends to signal the information over the connection to the positioning node, a number of alternative embodiments exist.

In a first embodiment, the UE measures the precoding index and the cell ID of a number of eNodeBs, including the serving eNodeB. The UE transmits a list of precoding indices and cell IDs to the serving eNodeB. The serving eNodeB transmits the list of precoding indices and cell IDs to the positioning node (e.g. E-SMLC in FIG. 8). The eNodeB position, the cell ID, the bore sight angle of the cell, and the lobe angles for each pre-coding index (or information needed to compute it as described above) are signalled on request by the positioning node, from the respective RBS to the positioning node or can be obtained from O&M (operations and maintenance). The E-SMLC associates the information from the different sources and calculates the AoAs from the received information. The positioning node has all information needed in order to compute a UE position e.g. using conventional approaches.

In a second embodiment, the UE measures the precoding index and the cell ID of a number of eNodeBs, including the serving eNodeB. The UE transmits a list of precoding indices and cell IDs to the serving eNodeB. The involved eNodeB(s) send to the serving eNodeB their corresponding position, cell ID, bore sight angle of the cell, and lobe angles for each pre-coding index (or information needed to compute it as described above) on request by the serving eNodeB, from the respective eNodeB to the serving eNodeB. The serving eNodeB calculates the AoAs of the eNodeBs, by association using cell IDs and combination of the available information. The serving eNodeB transmits a list of AoAs and eNodeB positions to the positioning node. The positioning node has all information needed in order to compute a UE position e.g. using conventional approaches.

In a third embodiment, the UE measures the precoding index and the cell ID of a number of eNodeBs, including the serving eNodeB. The UE transmits a list of precoding indices and cell IDs to the serving eNodeB. The involved eNodeB(s) send the corresponding cell ID, bore sight angle of the cell, and lobe angles for each pre-coding index (or information needed to compute it as described above) on request by the serving eNodeB, from the respective eNodeB to the serving eNodeB. The serving eNodeB associates information and calculates the AoAs of the eNodeBs as described in the second embodiment above. The serving eNodeB transmits a list of AoAs and cell IDs to the positioning node. The eNodeB(s) transmit their corresponding position to the positioning node, on request from the positioning node. The positioning node has all information needed in order to compute a UE position e.g. using conventional approaches.

Variants of these embodiments are possible. For example, eNodeB positions and associated cell IDs can be pre-configured in the positioning node. As such, it is enough to transmit cell IDs in combination with AoA. The positioning node can then associate the information and compute a position. Other alternatives can include signalling the information needed to compute AoA to the UE, and the UE then sends a list of cell IDs and the AoA to the serving eNodeB instead. Various logical (e.g. via higher-layer protocols, possibly via other nodes) communication links are contemplated in LTE based on the embodiments described above, such as: between eNodeB and positioning node; between UE and eNodeB (is used e.g. for reporting PMI); between UE and positioning node; between eNodeBs; between eNodeB and O&M; between positioning node and O&M; between LMU and positioning node; between LMU and eNodeB; between LMUs.

Regardless exchanging/signalling in one direction of a UE or positioning node, capability or indication can indicate the support of UE AoA and/or PMI/RI reporting. To enable determination of UE AoA in the UE, signalling can be defined from a radio node to the corresponding UE of the antenna-related information (e.g. antenna spacing, polarization and direction). To enable determination of UE AoA in the positioning node, signalling can be defined from the radio node to the positioning node, e.g. via LPPa, of the antenna-related information (e.g. antenna spacing, polarization and direction). The information may also be signalled from O&M or SON (self-organizing network) node. The signalling described above between a UE and the positioning node (via LPP or LPPe) implies that the signalling may be carried out over the control or user plane (e.g. with SUPL).

According to various embodiments described herein, eNodeB (UL) AoA determination can be enhanced in several ways. The main principles for calculating AoA in the UL direction are the same as previously described herein for the DL direction, except that the eNodeB AoA determination embodiments are based on radio node measurements (i.e. UL measurements).

In one embodiment, enhanced radio node processing is provided with IC to facilitate multi-cell radio node AoA-related measurements. The AoA-related measurements are performed on reference signals transmitted by the UE (e.g. Sounding Reference Signals, SRS, in LTE) or data transmissions (e.g. semi-persistently scheduled) in one or more radio nodes. The radio node can include e.g. an eNodeB or Location Measurement Unit (LMU), assuming the SRS scheduling for the transmitting UE is available in the measuring nodes. In one embodiment, the measuring nodes may e.g. include nodes involved in an UL CoMP session for that UE, and similarly for measuring UE AoA for multiple cells the measured nodes may include nodes involved in a DL CoMP session for that UE. Performing AoA-related measurements for a UE at the serving eNodeB or LMU implies cancelling of at least one of the strongest interferers. The strongest interferer may be from a neighbor cell. In FIG. 9 for example, RBS1 attempts to estimate AoA for UE-A in cell C1,1. In doing so, RBS1 can use IC to cancel UL signals originating from cell C2,x and/or cell C3,x. RBS1 can likewise use IC to cancel UL signals originating from other cells served by RBS1 such as cell C1,2 and/or cell C1,3. The AoA-related measurements, improved with IC, are used to derive radio node AoA, which may be done in the radio node or in a network node which receives the AoA-related measurements.

The AoA may be ultimately estimated in the radio node or in the network node (e.g. the positioning node) which receives PMI/RI reports. AoA-related measurements can be performed on reference signals transmitted by the UE (e.g. SRS in LTE) or data transmissions (e.g. semi-persistently scheduled) in one or more radio nodes such as an eNodeB or LMU. The eNodeB or LMU performs IC by cancelling at least one of the strongest interferers which is presumed to be from a UE served by the cell where the measurement occurs.

The AoA-related measurements, improved with IC, are used to derive radio node AoA, which may be done in the radio node or in a network node which receives the AoA-related measurements. These are UL AoA-related measurements with the principles described for PMI-based AoA for DL for enhanced UE AoA determination. The AoA may be ultimately estimated in the radio node or in the network node (e.g. the positioning node) which receives PMI/RI reports.

In another embodiment of eNodeB AoA determination, new UL PMI-related measurements in the radio node and PMI determination are realized for neighbor-cell UEs. Conventionally, PMI determination is only possible for the serving cell. In one embodiment, PMI/RI determination is also possible for neighbor-cell UEs. By this, eNodeB AoA determination based on PMI-related measurements or PMI/RI (determined based on the measurements) for multiple cells for the same UE is provided. The AoAs may be determined in the radio node or in a network node (if the PMIs can be signalled to the network).

In still another embodiment of eNodeB AoA determination, a signalling mechanism is provided to ensure delivery of the radio node angular information (PMI or eNodeB AoA) to the positioning node. In conventional approaches, only AoA signalling for the serving cell from the eNodeB to the positioning node is currently available in the standard. However, the following signalling enhancements are provided.

Signalling of AoA for multiple cells or multiple antenna ports from a radio node (e.g. eNodeB or LMU) to the positioning node, where the AoA is either radio node AoA measurement or radio node AoA derived from UE AoA as described previously herein. In one embodiment, the multiple cells include cells that belong to the same radio node. In another embodiment, cells associated with a non-serving radio node may also be included in the multiple cells. Signalling of AoA from non-serving radio nodes to the serving radio node may be envisioned also, e.g. via the X2 interface which is shown with dashed lines interconnecting the RBSs in FIG. 9. Alternatively, a non-serving radio node can report to the positioning node AoA measured for signals from a certain UE. In one specific embodiment, multiple antenna ports include antenna ports for a distributed antenna system, i.e. the antenna ports are not co-located. Multiple antenna ports may or may not belong to the serving cell and/or the serving radio node.

Signalling of PMI/RI to the positioning node for the radio node is also provided as is signalling of the AoA measurements or PMI/RI between radio nodes (e.g. eNodeBs, LMUs, or eNodeB and LMU). In one embodiment, the inter-node AoA reporting periodicity is in accordance with that requested by the positioning node in a request message sent to the serving eNodeB of the UE. Signalling of the AoA measurements from the LMU to the positioning node is also provided. In one embodiment, the SRS or data scheduling information is exchanged between radio nodes (e.g., signalling from the serving cell LMU to other LMUs or from eNodeB to LMU or between eNodeBs) for enhancing fingerprinting positioning, e.g. for E-CID or AECID, for AoA-related measurements in a particular example. The SRS or data scheduling information can be requested or used from the serving node (e.g. eNodeB) by another radio node (e.g. LMU) for enhancing fingerprinting positioning, e.g. E-CID or AECID, for AoA-related measurements in a particular example. To enable determination of radio node AoA in the positioning node, signalling is defined from the radio node to the positioning node, e.g. via LPPa, of the antenna-related information (e.g. antenna spacing, polarization and direction). The information may also be signalled from O&M or SON node.

The embodiments described herein improve quality of AoA measurements, improve positioning accuracy and availability for positioning methods using AoA, utilize IC for AoA, enable multi-cell AoAs based on PMIs both in DL and UL, and enhance signalling mechanisms for delivering UE angular information and radio node angular information to the positioning node.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of estimating a position of a mobile device served in a cell of a serving node of a wireless communication network, the method comprising:
    applying interference cancellation to aid in determining a precoding matrix indicator (PMI) for the serving node in a downlink direction or for the mobile device in an uplink direction;
    estimating an angle-of-arrival (AoA) between the mobile device and the serving node based on the PMI determined with the aid of interference cancellation; and
    estimating the position of the mobile device based on the estimated AoA,
    wherein applying interference cancellation to aid in determining a PMI comprises:
        canceling one or more interfering signals to obtain a channel estimate and a residual covariance matrix for a channel between the serving node and the mobile device;
        calculating, as a function of the channel estimate and the residual covariance matrix, which of a plurality of precoders maximizes a signal-to-noise ratio (SNR) of a signal between the serving node and the mobile device, the SNR thereby being maximized in a lobe that points towards the mobile device.

2. The method of claim 1, comprising:
    cancelling one or more interfering signals received from the neighbor node in the downlink direction to aid in determining the PMI for the serving node; and
    cancelling one or more interfering signals received from the serving node and/or one or more neighbor nodes in the downlink direction to aid in determining the PMI for the neighbor node.

3. The method of claim 1, comprising cancelling signals received from a different mobile device in the uplink direction to aid in determining the PMI for the serving node or neighbor node for the mobile device served by the serving node, wherein the different mobile device is served by the serving node or another radio node.

4. The method of claim 1, wherein said calculating comprises calculating which precoder $W_{RI,PMI}$ maximize the expression
$SNR^{IC}=(H^{IC}W_{RI,PMI})^H(R_e^{IC})^{-1}(H^{IC}W_{RI,PMI})$, where $SNR^{IC}$ is said SNR, $H^{IC}$ is said channel estimate, and $R_e^{IC}$ is said residual covariance matrix.

5. A radio node of a wireless communication network, comprising one or more processing circuits operable to:
    cancel one or more interfering signals received from other mobile devices to aid in determining a precoding matrix indicator (PMI) for a mobile device served in a cell associated with the serving node in an uplink direction;
    estimate an angle-of-arrival (AoA) between the mobile device and the serving node based on the PMI determined with the aid of interference cancellation; and
    estimate the position of the mobile device based on the estimated AoA,
    wherein the one or more processing circuits are operable to cancel the one or more interfering signals to aid in determining a PMI, by:
        canceling one or more interfering signals to obtain a channel estimate and a residual covariance matrix for a channel between the serving node and the mobile device;
        calculating, as a function of the channel estimate and the residual covariance matrix, which of a plurality of precoders maximizes a signal-to-noise ratio (SNR) of a signal between the serving node and the mobile device, the SNR thereby being maximized in a lobe that points towards the mobile device.

6. The radio node of claim 5, wherein the radio node is the serving node or a non-serving neighbor node.

7. A mobile device, comprising one or more processing circuits operable to:
    determine a precoding matrix indicator (PMI) for a serving node of a wireless communication network which serves the mobile station, and apply interference cancellation to aid in determining the PMI for the serving node,
    determine a PMI for a non-serving neighbor node of the wireless communication network and apply interference cancellation to aid in determining the PMI for the non-serving neighbor node, and
    estimate an angle-of-arrival (AoA) between the mobile device and the serving node based on the PMI determined for the serving node and node position, bore sight angle and lobe angles associated with the serving node which are signalled to the mobile device in a downlink direction, estimate the AoA between the mobile device and the neighbor node based on the PMI determined for the neighbor node and node position, bore sight angle and lobe angles associated with the neighbor node which are signalled to the mobile device in the downlink direction, and signal the AoAs and corresponding cell IDs to the serving node.

8. The mobile device of claim 7, wherein the one or more processing circuits are operable to signal the PMI for the serving node and the PMI for the neighbor node to the serving node.

9. The mobile device of claim 7, wherein the one or more processing circuits are operable to cancel signals received from one or more neighbor cells to aid in determining the PMI for the serving node and cancel signals received from at least one of a serving cell and the one or more neighbor cells to aid in determining the PMI for the neighbor node.

* * * * *

UNITED STATES PATENT AND TRADEMARK OFFICE
CERTIFICATE OF CORRECTION

PATENT NO.        : 8,731,579 B2                                        Page 1 of 1
APPLICATION NO.   : 13/262533
DATED             : May 20, 2014
INVENTOR(S)       : Siomina et al.

It is certified that error appears in the above-identified patent and that said Letters Patent is hereby corrected as shown below:

In the Specification

Column 12, Line 9, delete "mod(UE$_{AoA+pi}$,2*pi)." and insert -- mod(UE_AoA+pi,2*pi). --, therefor.

Signed and Sealed this
Twenty-third Day of September, 2014

Michelle K. Lee
*Deputy Director of the United States Patent and Trademark Office*